(12) United States Patent
Murayama et al.

(10) Patent No.: US 8,343,263 B2
(45) Date of Patent: Jan. 1, 2013

(54) VAPOR STORAGE CANISTER ARRANGEMENT

(75) Inventors: Susumu Murayama, Saitama (JP); Takeaki Nakajima, Saitama (JP); Shoichi Hokazono, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 315 days.

(21) Appl. No.: 12/921,206

(22) PCT Filed: Feb. 20, 2009

(86) PCT No.: PCT/JP2009/000733
§ 371 (c)(1),
(2), (4) Date: Oct. 7, 2010

(87) PCT Pub. No.: WO2009/110182
PCT Pub. Date: Sep. 11, 2009

(65) Prior Publication Data
US 2011/0017069 A1    Jan. 27, 2011

(30) Foreign Application Priority Data
Mar. 7, 2008    (JP) .................................. 2008-057524

(51) Int. Cl.
*F02M 25/08* (2006.01)
*B01D 53/04* (2006.01)
(52) U.S. Cl. .............................. 96/131; 96/133; 96/136
(58) Field of Classification Search ................... 95/146; 96/121, 131, 133, 134, 136, 147; 123/519
See application file for complete search history.

(56) References Cited

U.S. PATENT DOCUMENTS

| | | | | |
|---|---|---|---|---|
| 4,805,581 A | * | 2/1989 | Yamada et al. | 123/519 |
| 5,564,398 A | * | 10/1996 | Maeda et al. | 123/520 |
| 5,702,125 A | * | 12/1997 | Nakajima et al. | 280/834 |
| 5,855,198 A | * | 1/1999 | Nakajima et al. | 123/520 |
| 5,868,428 A | | 2/1999 | Ishikawa | |
| 6,343,591 B1 | | 2/2002 | Hara et al. | |
| 6,395,072 B2 | * | 5/2002 | Miura et al. | 96/133 |
| 6,514,326 B1 | | 2/2003 | Hara et al. | |
| 6,893,047 B2 | | 5/2005 | Chou et al. | |
| 7,810,842 B2 | * | 10/2010 | Ichikawa | 280/782 |
| 7,976,618 B2 | * | 7/2011 | Geurtz | 96/131 |
| 8,033,353 B2 | * | 10/2011 | Sawauchi | 180/69.4 |
| 8,177,259 B2 | * | 5/2012 | Ohara | 280/834 |

FOREIGN PATENT DOCUMENTS

| | | |
|---|---|---|
| JP | 60-104756 A | 6/1985 |
| JP | 11-280569 A | 10/1999 |
| JP | 2001-152977 A | 6/2001 |
| JP | 2002-067716 A | 3/2002 |
| JP | 2004-143966 A | 5/2004 |
| JP | 3951427 B2 | 5/2007 |

\* cited by examiner

*Primary Examiner* — Frank Lawrence, Jr.
(74) *Attorney, Agent, or Firm* — Carrier Blackman & Associates, P.C.; Joseph P. Carrier; William D. Blackman

(57) ABSTRACT

To a canister assembly to be installed in a vehicle body having a differential device mounted on a rear part thereof without reducing the space above a floor panel while ensuring an adequate adsorption chamber volume. The canister assembly (22) comprises a first adsorption chamber (31) for adsorbing fuel vapor introduced from a fuel tank (8); a second adsorption chamber (32) for adsorbing fuel vapor introduced from the first adsorption chamber; and a chamber communication pipe (46) for communicating the first adsorption chamber with the second adsorption chamber; wherein the first adsorption chamber and second adsorption chamber are provided separately from each other on either side of the differential device.

4 Claims, 6 Drawing Sheets

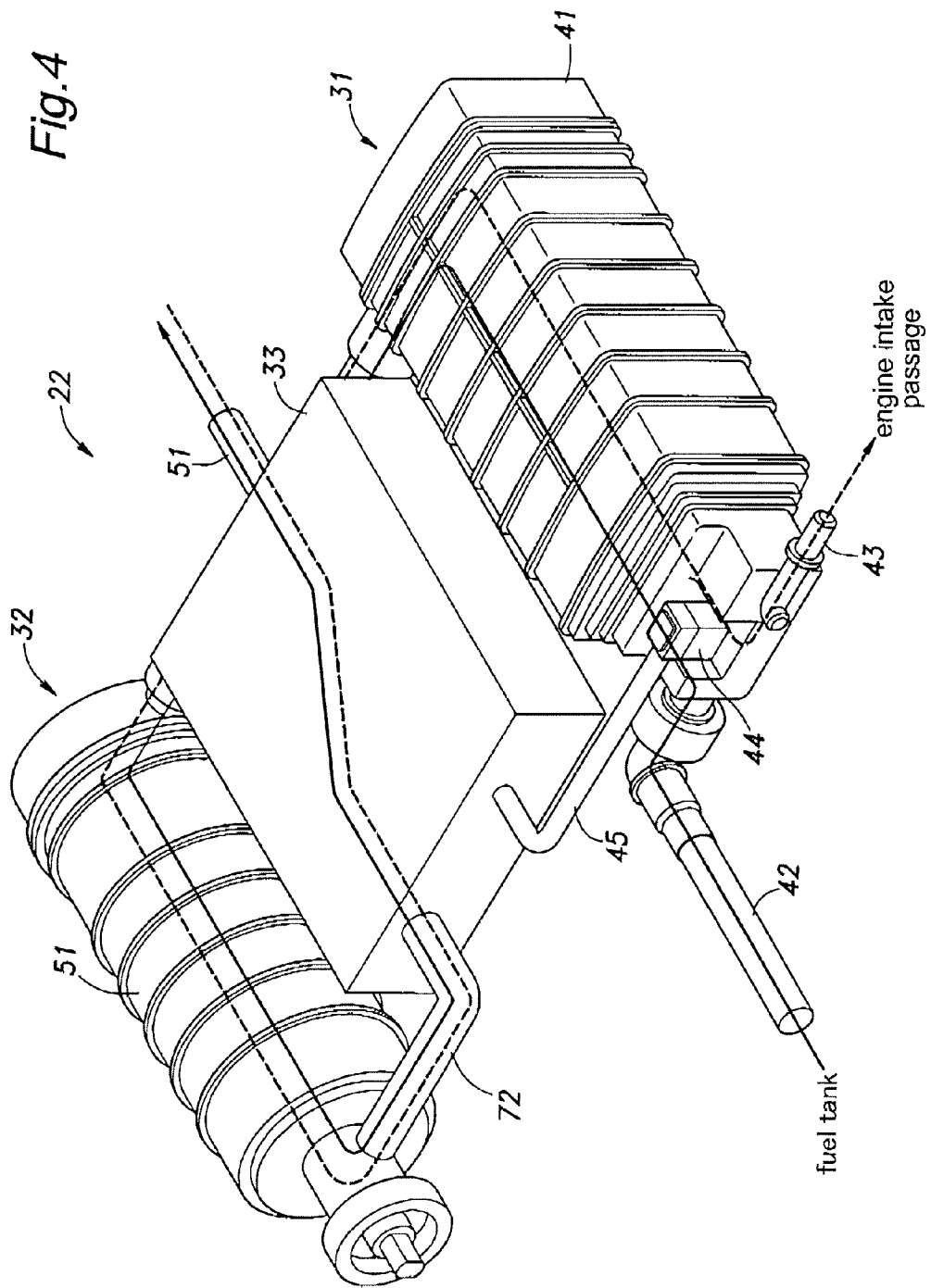

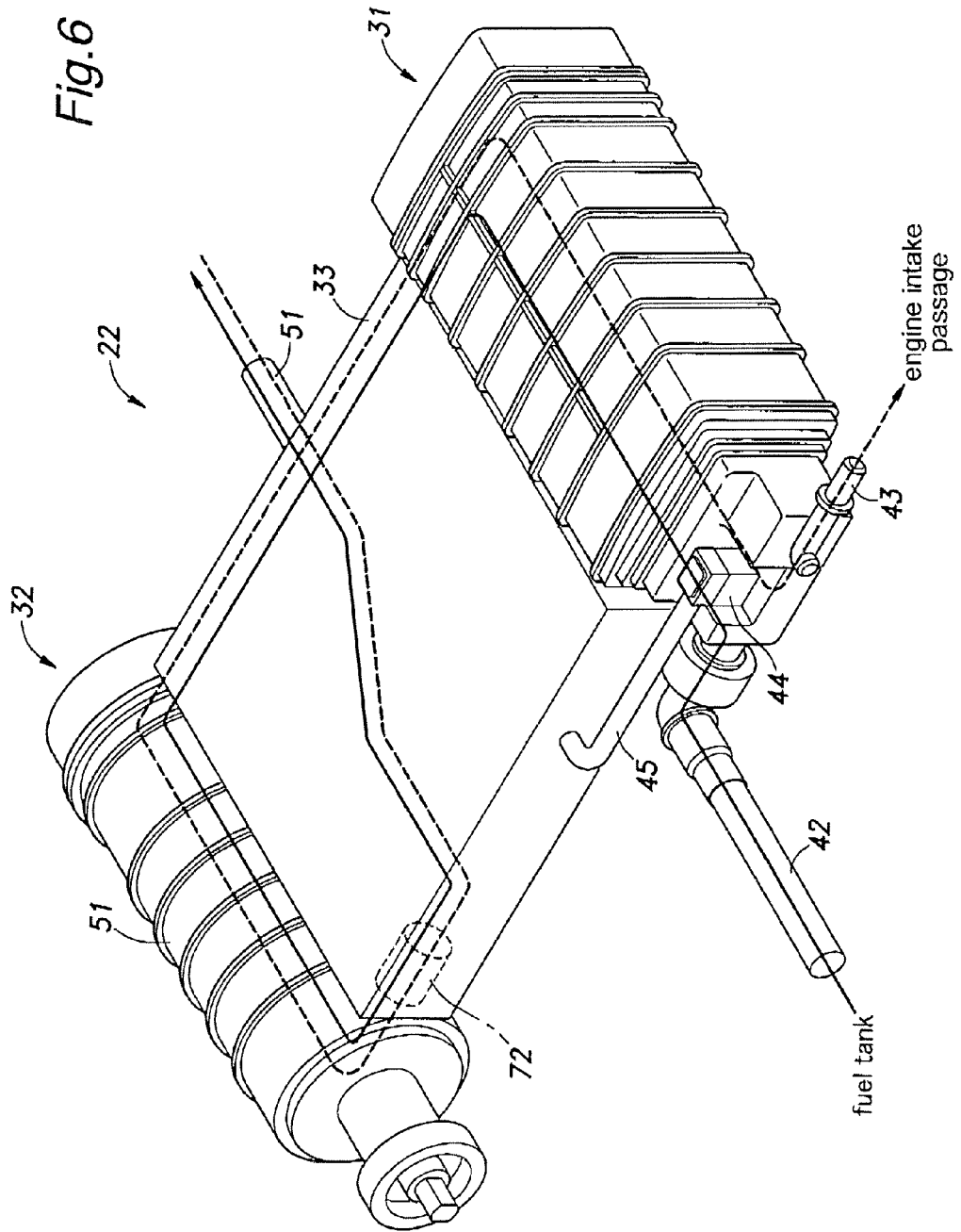

VAPOR STORAGE CANISTER ARRANGEMENT

TECHNICAL FIELD

The present invention relates to an arrangement for a vapor storage canister assembly that prevents fuel vapor generated in a fuel tank from being released to the atmosphere.

BACKGROUND OF THE INVENTION

In an automobile, a fuel tank is sometimes provided under a floor panel, and a vapor storage canister (charcoal canister) is provided adjacent to the fuel tank for the purpose of adsorbing fuel vapor that is generated in the fuel tank. To promptly adsorb the fuel vapor generated in the fuel tank, it is desirable to ensure an adequate storage volume, and place the vapor storage canister (which is referred to simply as "canister" in the following description) as close to the fuel tank as possible. Also, as the space available for installing the canister is limited, various proposals have been made so as to optimize the shape and layout of the canister.

As one such technology, it is known to place a canister between a front end and a rear end of a sub-frame attached to a rear part of a vehicle body frame at a higher elevation than the fuel tank so as to be adjacent or substantially adjacent to the lower surface of the floor panel. See patent document 1.

A known canister comprises a canister casing defining a first adsorption chamber filled with activated charcoal for adsorbing fuel vapor introduced from an inlet port and a second adsorption chamber provided in parallel with the first adsorption chamber and filled with activated charcoal for adsorbing vapor fuel released from the first adsorption chamber. A first space is defined in a part of the second adsorption chamber on the side of the inlet port, and a second space is defined in parallel with the first and second adsorption chambers such that the length of the second space as measured along the direction directed toward the inlet portion is longer than that of the second adsorption chamber, and a communication hole is formed in a wall separating the first space and second space from each other to communicate the first and second chambers to each other. The canister casing is formed with an atmospheric port for communicating the atmosphere with the second space, and is provided with a filter for preventing the intrusion of foreign matters into the second space. See patent document 2.

Patent Document 1: Japanese patent laid open publication No. 2004-143966
Patent Document 2: Japanese patent No. 3951427

BRIEF SUMMARY OF THE INVENTION

Task to be Accomplished by the Invention

A rear drive vehicle (including a four-wheel drive vehicle) is provided with a mechanism for transmitting power from an engine mounted on a front part of the vehicle to a differential device for the rear wheels via a propeller shaft. The differential device is placed under a floor panel, and is connected to the propeller shaft extending in the fore-and-aft direction at a laterally middle part of the vehicle body.

In such a rear drive vehicle, when a relatively small canister is used as is the case in Patent Document 1, the canister can be placed in a relatively limited space such as a space above or on either side of the differential device. However, when the canister incorporates a first adsorption chamber, a second adsorption chamber and a filter into a single canister case as is the case in Patent Documents 2, the need for an adequate volumes for the two adsorption chambers prevents the overall size of the canister to be reduced beyond a certain limit. Therefore, in such a case, to allow the canister to be installed without being interfered by the differential device, the floor panel has to be raised to create a space for installing the canister, and this caused the cabin space and/or the trunk space to be sacrificed.

The present invention was made in view of such problems of the prior art, and has a primary object to provide an arrangement for a vapor storage canister assembly that allows a canister assembly to be installed on a vehicle body without reducing the space above a floor panel while ensuring an adequate adsorption chamber volume in a vehicle having a differential device mounted in a rear part of a vehicle body.

Means to Accomplish the Task

To accomplish such a task, a first aspect of the present invention provides a vapor storage canister arrangement for a vehicle (1) having a differential device (21) mounted on a rear part of a vehicle body, comprising: a first adsorption chamber (31) for adsorbing fuel vapor introduced from a fuel tank (8); a second adsorption chamber (32) for adsorbing fuel vapor introduced from the first adsorption chamber; and a chamber communication pipe (46) for communicating the first adsorption chamber with the second adsorption chamber; wherein the first adsorption chamber and second adsorption chamber are provided separately from each other on either side of the differential device.

To accomplish such a task, a second aspect of the present invention provides an arrangement in which the second adsorption chamber has a smaller volume than the first adsorption chamber, and is provided with a filter box (33) integrally formed with the second adsorption chamber and communicating with both the second adsorption chamber and atmosphere.

To accomplish such a task, a third aspect of the present invention provides an arrangement which further includes a filter box communicating with both the second adsorption chamber and atmosphere, wherein the filter box is located directly above the differential device.

To accomplish such a task, a fourth aspect of the present invention provides an arrangement in which a filter communication pipe (72) is provided in one of the second adsorption chamber and filter box, and a receiving hole (73) for wholly receiving the filter communication pipe is provided in the other of the second adsorption chamber and filter box.

According to the first aspect of the present invention, by placing the two adsorption chambers of the canister assembly on either side of the differential device separately from each other, the canister assembly is allowed to be installed in the vehicle body without reducing the space above the floor panel while ensuring an adequate adsorption chamber volume. According to the second aspect of the present invention, the space on either side of the differential device can be effectively utilized for installing the two adsorption chambers and filter box. According to the third aspect of the present invention, the space above the differential device can be effectively utilized for installing the filter box. According to the fourth aspect of the present invention, the freedom in the design of the filter box placed above the differential device can be improved, and the work required for connecting the filter box with second adsorption chamber can be simplified.

BRIEF DESCRIPTION OF THE DRAWINGS

FIG. 4 is a detailed perspective view showing a canister assembly of a second embodiment;

FIG. 6 is a detailed perspective view showing a canister assembly of a third embodiment;

DETAILED DESCRIPTION OF THE PREFERRED EMBODIMENT(S)

The present invention is described in the following in terms of specific embodiments thereof with reference to the appended drawings. The terms denoting "front", "rear", "left", "right", "up" and "down" as used in this disclosure should be understood as being with reference to a vehicle body unless otherwise specified.

Figure 1:
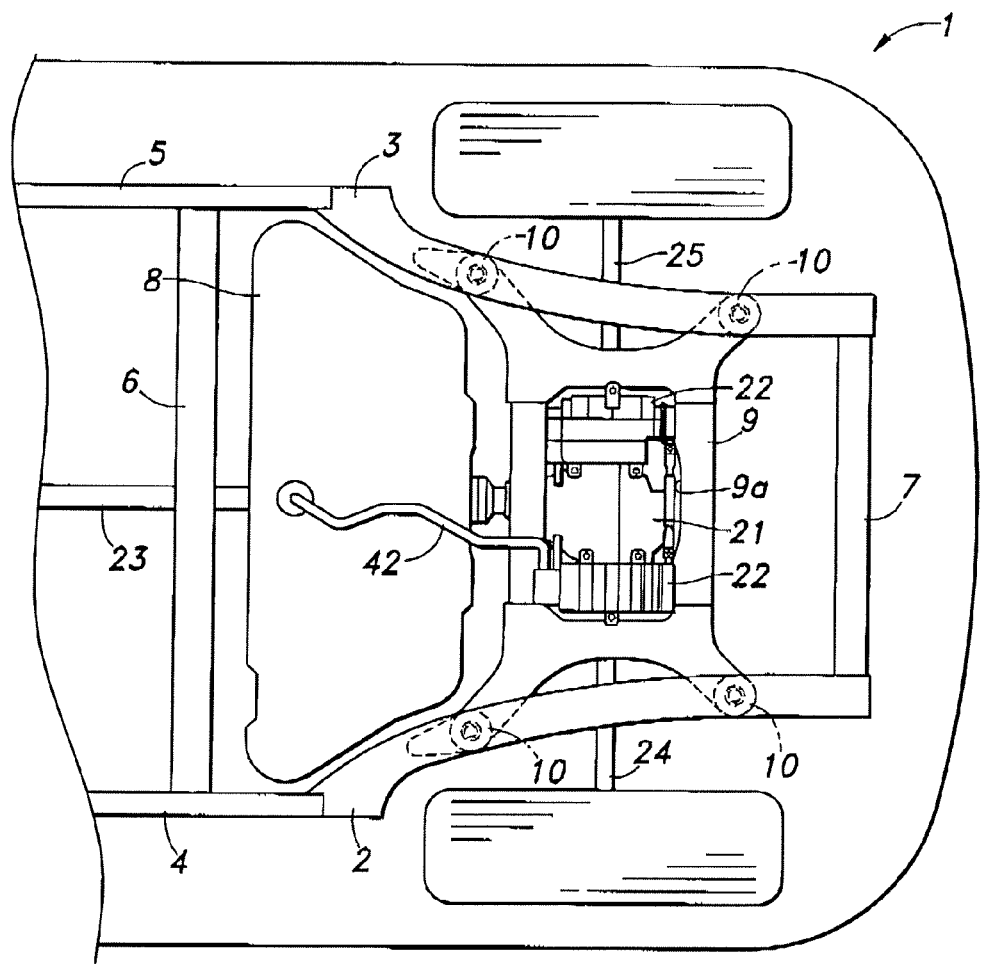
FIG. 1 is a bottom view of a rear part of a motor vehicle incorporated with a vapor storage canister arrangement given as a first embodiment of the present invention.
Figure 2:
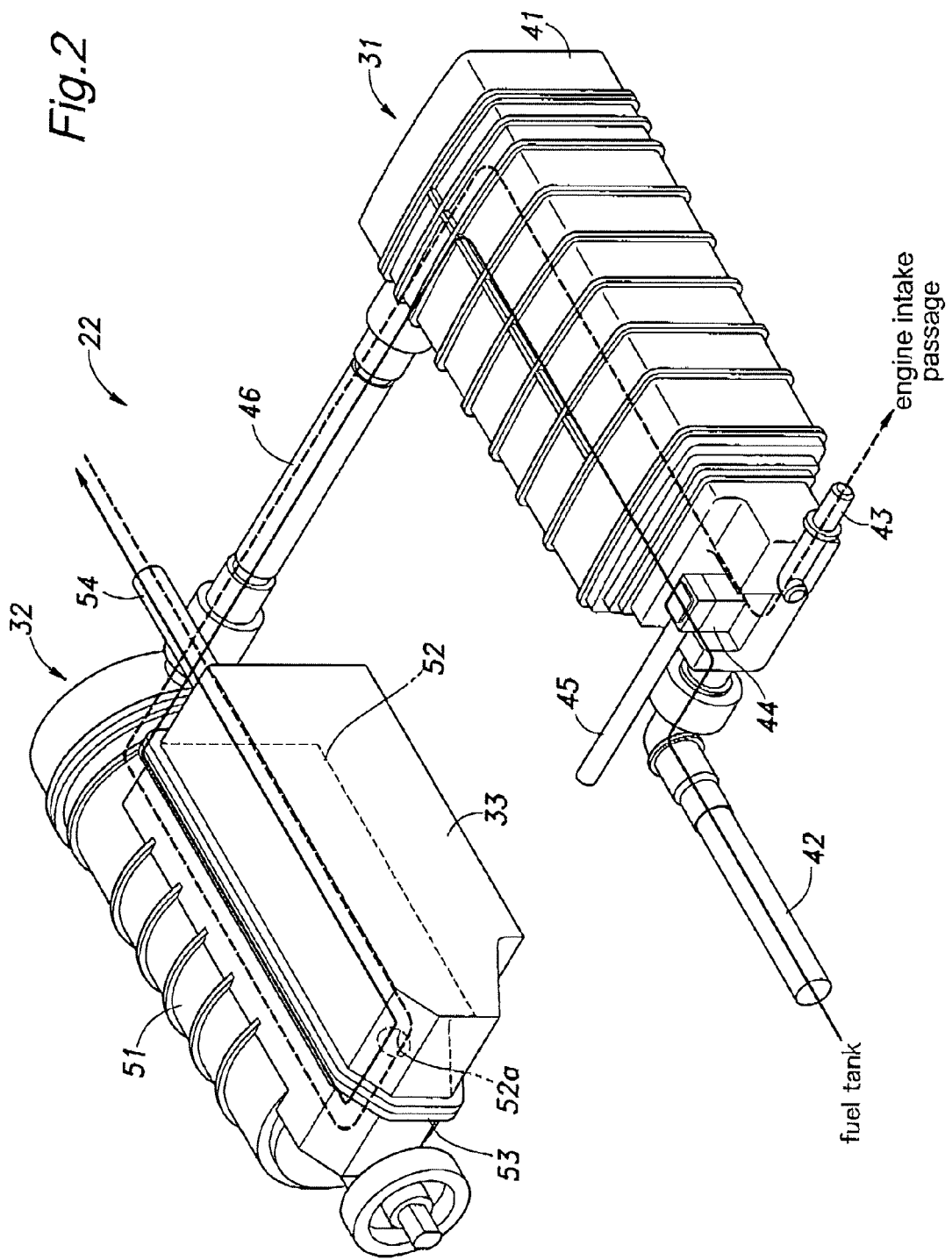
FIG. 2 is a perspective view showing a canister assembly of the first embodiment in greater detail.
Figure 3:
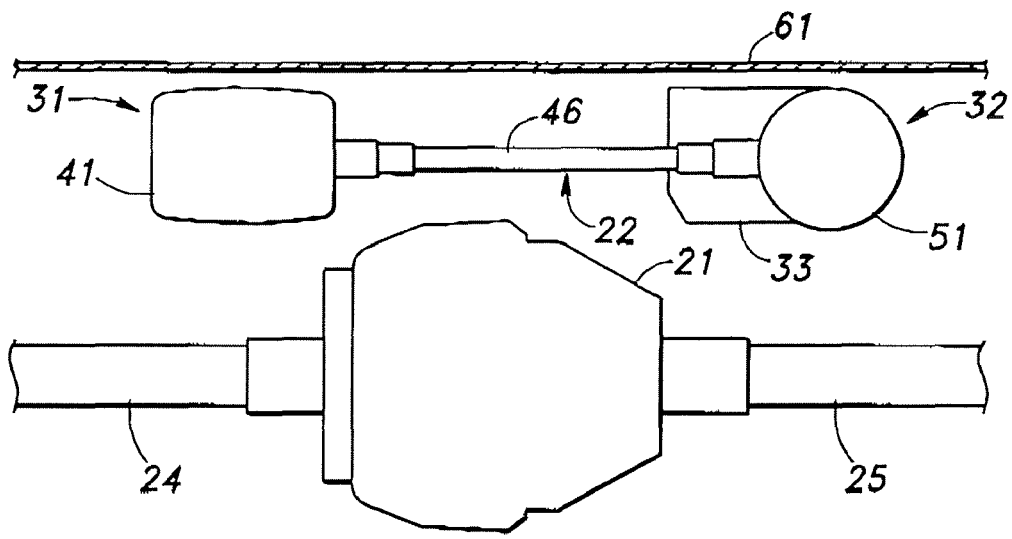
FIG. 3 is a simplified rear view of the canister assembly and a differential device of the first embodiment.

FIG. 1 is a plan view of various components arranged under the floor in a rear part of a motor vehicle incorporated with a vapor storage canister arrangement given as a first embodiment of the present invention (the floor itself and cabin are omitted from the illustration). FIG. 2 is a detailed perspective view of a canister assembly, and FIG. 3 is a simplified rear view showing the relationship between the canisters and a differential device.

Referring to FIG. 1, the illustrated motor vehicle 1 consists of a FR (front engine rear drive) passenger vehicle. Under the rear part of the floor (rear floor panel), a pair of rear side members 2 and 3, a pair of side sills 4 and 5, a middle cross member 6 and a rear cross member 7 are joined to one another by spot welding. The lateral ends of the middle cross member 6 and rear cross member 7 are joined to the corresponding rear side members 2 and 3, and a fuel tank 8 made of plastic material is placed in a space defined by the rear side members 2 and 3, rear parts of the side sills 4 and 5 and the two cross members 6 and 7. To the lower sides of the rear side members 2 and 3 are attached a sub-frame 9 via threaded bolts 10 passed through central holes of mount bushes made of anti-vibration rubber. The sub-frame 9 supports a wheel suspension system not shown in the drawings.

A differential device 21 is received in a central opening 9a of the sub frame 9, and canisters of a canister assembly 22 are located above the lateral side ends of the differential device 21. To the differential device 21 is transmitted a drive force from an engine not shown in the drawings via a propeller shaft 23. The drive force is further transmitted to rear wheel drive axles 24 and 25 via a per se known gear mechanism of the differential device.

The canister assembly 22 includes a first adsorption chamber 31 for adsorbing fuel vapor introduced from the fuel tank 8, a second adsorption chamber 32 for adsorbing fuel vapor introduced from the first adsorption chamber 31 and a filter box 33 communicating with both the second adsorption chamber 32 and atmosphere in such a manner that foreign matters such as dust contained in the atmosphere are prevented from entering the second adsorption chamber 32.

The first adsorption chamber 31 includes a rectangular box shaped housing 41 and activated charcoal filled in the housing 41 as an adsorbing agent for the fuel vapor generated in the fuel tank, and an upstream end of the first adsorption chamber 31 is provided with a charge port 42 connected to the fuel tank and a purge port 43 connected to an intake passage of the engine. The charge port 42 is provided with a pressure sensor 44 which is provided with a communication pipe 45 communicating with the atmosphere so that a pressure difference between the atmospheric pressure and fuel tank internal pressure can be detected. To a downstream part of a side wall of the first adsorption chamber 31 is connected a chamber communication pipe 46 communicating the first adsorption chamber 31 with the second adsorption chamber 32.

The second adsorption chamber 32 includes a substantially cylindrical housing 51 and, similarly as the first adsorption chamber 31, activated charcoal filled in the housing 51 as an adsorbing agent for fuel vapor. To an upstream part of a side wall of the second adsorption chamber 32 is connected the chamber communication pipe 46. The housing 51 of the second adsorption chamber 32 has a smaller volume than the housing 41 of the first adsorption chamber 31. A side of the second adsorption chamber 32 adjoining the first adsorption chamber 31 is integrally formed with the filter box 33. The housing 51 of the second adsorption chamber 32 and the filter box 33 are separated from each other by a partition wall 52, and communication between them is afforded solely via a communication hole 52a provided in the partition wall 52.

The filter box 33 is fixedly attached to the housing 51 of the second adsorption chamber 32 via a flange portion 53, and internally receives a filter element of a per se known air filter system (not shown in the drawings). A rear end wall on the downstream end of the filter box 33 is provided with a communication pipe 54 for communicating with the atmosphere.

As shown in FIG. 3, the canister assembly 22 is disposed in such a manner that the first adsorption chamber 31 and second adsorption chamber 32 (including the filter box 33) are positioned above the differential device 21 on either side thereof. The first adsorption chamber 31 and second adsorption chamber 32 are fixedly attached to the lower surface of a rear floor panel 61 via fixing members not shown in the drawings.

In the canister assembly 22 described above, when the engine is not in operation, as shown by the solid line arrow in FIG. 2, the fuel vapor produced in the fuel tank is introduced into the first adsorption chamber 31 to be adsorbed by the activated charcoal therein. The part of the fuel vapor that is not adsorbed by the activated charcoal is introduced into the second adsorption chamber 32 via the chamber communication pipe 46 to be adsorbed by the activated charcoal in the second adsorption chamber 32. On the other hand, when the engine is in operation, as shown by the dotted line arrow in FIG. 2, because air is drawn from the side of the intake passage of the engine, atmospheric air is introduced into the filter box 33 via the communication pipe 54 so that the fuel vapor in the second adsorption chamber 32 and first adsorption chamber 31 is forwarded to the intake passage of the engine via the purge port 43.

In the illustrated embodiment, because the two adsorption chambers 31 and 32 are placed on either side of the differential device, in spite of the limited space available between the rear floor panel 61 and differential device 21, an adequate volume can be ensured for the adsorption chambers without taking up any space above the level of the rear floor panel 61. Therefore, the mounting space for the canister assembly can be secured without causing the rear floor panel 61 to intrude upward (by forming a bulge, for example) so that the cabin space and/or trunk space can be maximized.

Also, because the second adsorption chamber 32 has a smaller volume than the first adsorption chamber 31, and is integrally formed with the filter box 33, the space available on either side of the different device 21 can be effectively utilized in installing the two adsorption chambers 31 and 32 and filter box 33.

Figure 5:
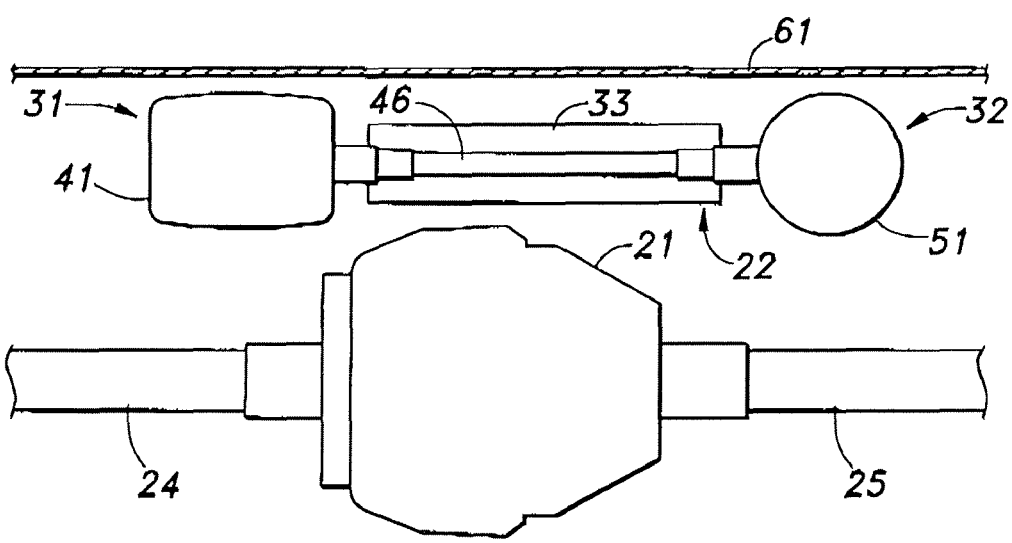
FIG. 5 is a simplified rear view of the canister assembly and a differential device of the second embodiment.

FIG. 4 is a perspective view showing the details of a canister assembly given as a second embodiment of the present invention, and FIG. 5 is a simplified rear end view showing the positional relationship between the canisters and differential device. In FIGS. 4 and 5 illustrating the second embodiment, unless otherwise specified, the parts corresponding to those of the first embodiment shown in FIGS. 2 and 3 are denoted with like numerals without repeating the description of such parts.

Referring to FIGS. 4 and 5, the filter box 33 of the second embodiment is provided separately from the second adsorption chamber 32, and is placed in a part above the differential device 21 intermediate between the first adsorption chamber 31 and second adsorption chamber 32. The second adsorption chamber 32 is communicated with the filter box 33 via a filter communication pipe 72. The communication pipe 45 of the pressure sensor 44 on the side of the first adsorption chamber 31 is connected to the filter box 33 and thereby communicates with the atmosphere.

Because the filter box is placed directly above the differential device 21 as described above, the space available above the differential device can be effectively utilized, and the freedom in the design (shape, volume, etc.) of the filter box 33 can be improved. Because the filter box 33 is provided as a separate member from the second adsorption chamber 32, the volume of the second adsorption chamber 32 can be maximized.

Figure 7:
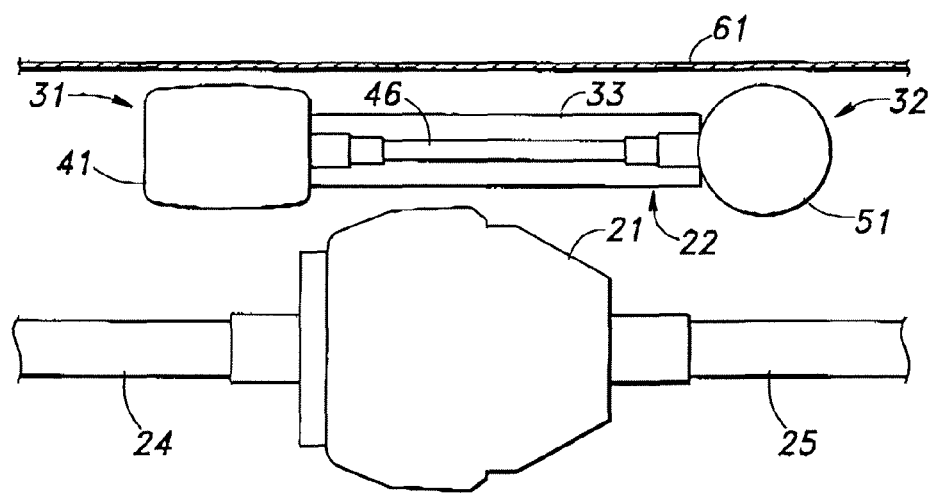
FIG. 7 is a simplified rear view of the canister assembly and a differential device of the third embodiment.
Figure 8:
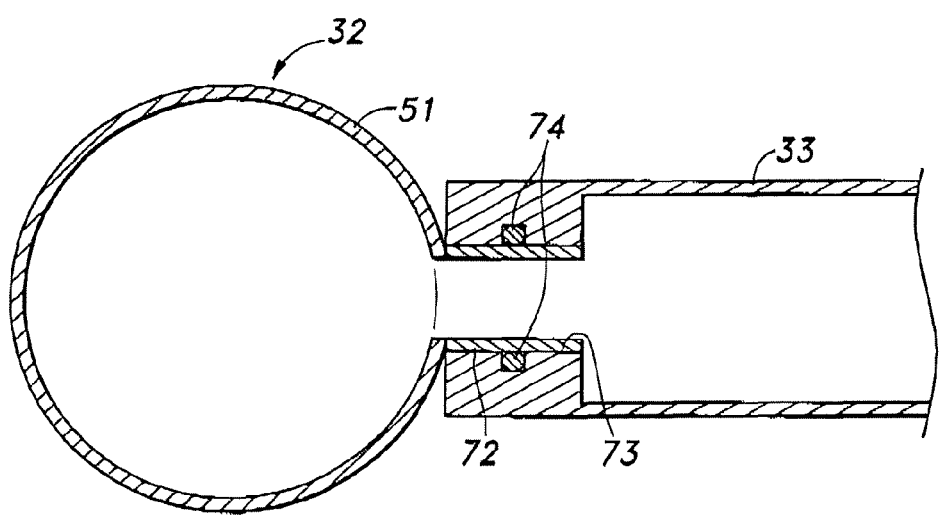
FIG. 8 is an enlarged sectional view of a structure for coupling a second adsorption chamber with a filter box in the third embodiment.

FIG. 6 is a perspective view showing the details of a canister assembly give as a third embodiment of the present invention, FIG. 7 is a simplified rear end view showing the positional relationship between the canisters and differential device, and FIG. 8 is a simplified enlarged view showing the structure for connecting the second adsorption chamber of the canister with the filter box. In FIGS. 6 to 8 illustrating the third embodiment, unless otherwise specified, the parts corresponding to those of the second embodiment shown in FIGS. 4 and 5 are denoted with like numerals without repeating the description of such parts.

Similarly as the second embodiment, the filter box 33 is provided separately from the second adsorption chamber 32, and is placed in a part above the differential device 21 intermediate between the first adsorption chamber 31 and second adsorption chamber 32. In the illustrated embodiment, as shown in FIG. 8, the second adsorption chamber 32 communicates with the filter box 33 on account of a filter communication pipe 72 provided on a side of the second adsorption chamber 32 being fitted into a receiving hole 73 provided on a side of the filter box 33 which is provided with a O-ring 74 for sealing.

The structure descried above has the advantage of simplifying the work required for connecting the filter box 33 to the second adsorption chamber 32.

Although the present invention has been described in terms of preferred embodiments thereof, it is obvious to a person skilled in the art that various alterations and modifications are possible without departing from the scope of the present invention which is set forth in the appended claims. For instance, the canister assembly was provided with two adsorption chambers in the foregoing embodiments, but may also comprise more than two adsorption chambers as long as the adsorption chambers are provided at least on either side of the differential device. Likewise, the shapes of the adsorption chambers and filter box can be freely changed without departing from the spirit of the present invention.

LIST OF NUMERALS 1 motor vehicle
8 fuel tank
9 sub-frame
21 differential device
22 canister assembly
23 propeller shaft
24, 25 rear drive axle
31 first adsorption chamber
32 second adsorption chamber
33 filter box
41 housing
42 charge port
43 purge port
46 chamber communication pipe
51 housing
61 rear floor panel
72 filter communication pipe
73 receiving hole

The invention claimed is:

1. A vapor storage canister arrangement for a vehicle having a differential device mounted on a rear part of a vehicle body, comprising:
   a first adsorption chamber for adsorbing fuel vapor introduced from a fuel tank;
   a second adsorption chamber for adsorbing fuel vapor introduced from the first adsorption chamber; and
   a chamber communication pipe for communicating the first adsorption chamber with the second adsorption chamber;
   wherein the first adsorption chamber and second adsorption chamber are provided separately from each other on either side of the differential device.

2. The vapor storage canister arrangement according to claim 1, wherein the second adsorption chamber has a smaller volume than the first adsorption chamber, and is provided with a filter box integrally formed with the second adsorption chamber and communicating with both the second adsorption chamber and atmosphere.

3. The vapor storage canister arrangement according to claim 1, further comprising a filter box communicating with both the second adsorption chamber and atmosphere, wherein the filter box is located directly above the differential device.

4. The vapor storage canister arrangement according to claim 3, wherein a filter communication pipe is provided in one of the second adsorption chamber and filter box, and a receiving hole for wholly receiving the filter communication pipe is provided in the other of the second adsorption chamber and filter box.

* * * * *